(12) United States Patent
Maeda

(10) Patent No.: US 7,145,598 B2
(45) Date of Patent: Dec. 5, 2006

(54) IMAGE PICKUP APPARATUS CAPABLE OF MAKING EFFECTIVE DEPICTION BY REDUCING PIXEL SIGNALS

(75) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 09/777,048

(22) Filed: Feb. 5, 2001

(65) Prior Publication Data

US 2001/0012063 A1    Aug. 9, 2001

(30) Foreign Application Priority Data

Feb. 8, 2000  (JP)  ............................. 2000-030921
Jan. 23, 2001 (JP)  ............................. 2001-014587

(51) Int. Cl.
*H04N 5/228*  (2006.01)
(52) U.S. Cl. .................................... 348/222.1; 348/345
(58) Field of Classification Search ............ 348/222.1, 348/220.1, 333.11, 345; 396/121
See application file for complete search history.

(56) References Cited

U.S. PATENT DOCUMENTS

| | | | | |
|---|---|---|---|---|
| 5,790,192 A | * | 8/1998 | Konishi et al. | 348/333.02 |
| 5,828,406 A | * | 10/1998 | Parulski et al. | 348/220.1 |
| 6,002,429 A | * | 12/1999 | Ochi et al. | 348/220.1 |
| 6,018,363 A | * | 1/2000 | Horii | 348/219.1 |
| 6,124,888 A | * | 9/2000 | Terada et al. | 348/302 |
| 6,308,015 B1 | * | 10/2001 | Matsumoto | 396/106 |
| 6,445,416 B1 | * | 9/2002 | Kyuma et al. | 348/240.3 |
| 6,563,535 B1 | * | 5/2003 | Anderson | 348/231.2 |
| 6,661,451 B1 | * | 12/2003 | Kijima et al. | 348/220.1 |
| 6,697,106 B1 | * | 2/2004 | Saito | 348/222.1 |
| 6,727,949 B1 | * | 4/2004 | Saruwatari et al. | 348/349 |
| 6,785,469 B1 | * | 8/2004 | Ide et al. | 396/121 |
| 2001/0013897 A1 | * | 8/2001 | Kowno et al. | 348/240 |

\* cited by examiner

*Primary Examiner*—Vivek Srivastava
*Assistant Examiner*—Gevell Selby
(74) *Attorney, Agent, or Firm*—Cowan, Liebowitz & Latman, P.C.

(57) ABSTRACT

An image pickup apparatus is provided with a number-of-pixels reducing circuit arranged to form a reduced image by reducing to a predetermined number the effective pixels among all pixels owned by an image sensor in such a manner that the method for reducing the effective pixels changes when the image pickup mode of the apparatus is set to a first mode (a small-image-plane image pickup mode). The number of effective pixels is reduced in a manner apposite to the situation in which an image is picked up. Exposure control is performed appositely to the reduction of effective pixels, so that depiction can be effectively made by taking advantage of the effect of depth of field, etc., according to the situation.

8 Claims, 9 Drawing Sheets

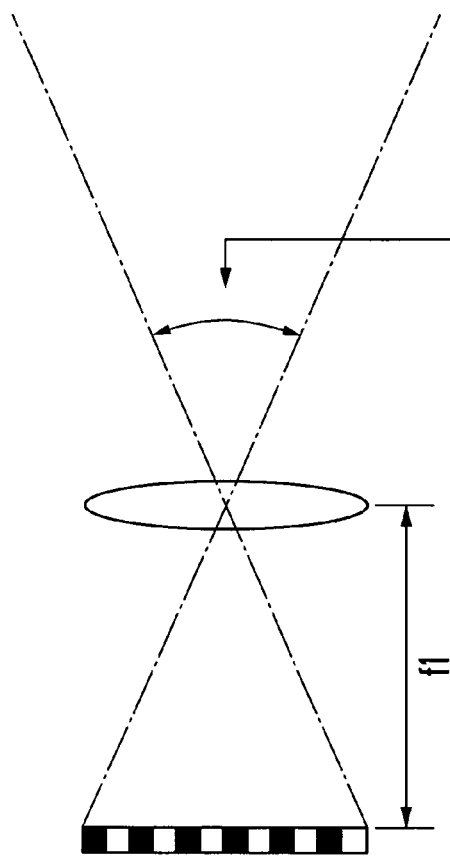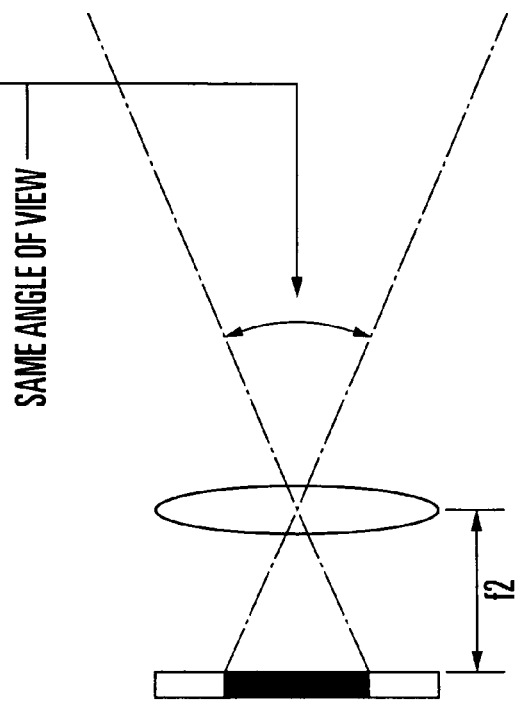
F I G. 2A  PORTRAIT MODE
F I G. 2B  LANDSCAPE MODE

FIG. 3A
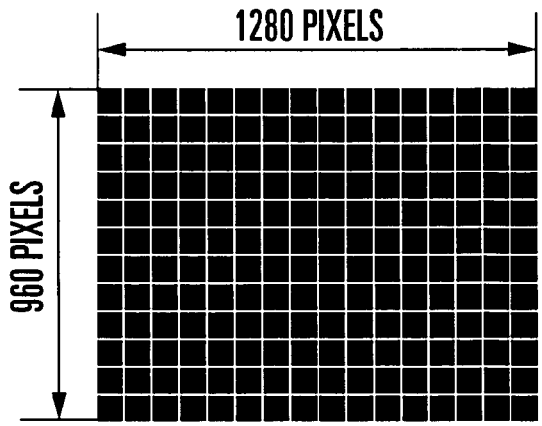
FIG. 3B  PORTRAIT MODE
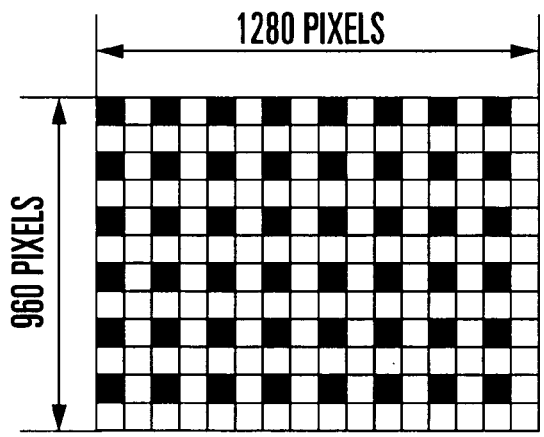
■ = EFFECTIVE PIXEL
☐ = INEFFECTIVE PIXEL
FIG. 3C  LANDSCAPE MODE
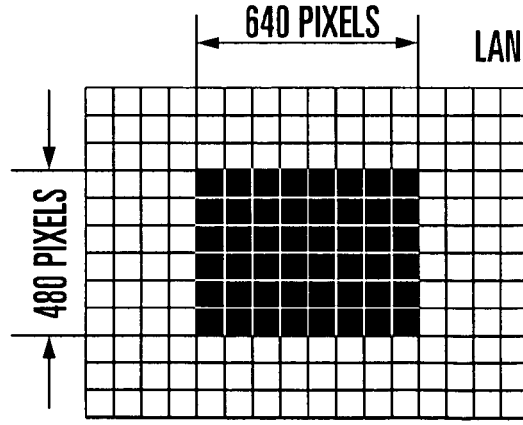

IMAGE PICKUP APPARATUS CAPABLE OF MAKING EFFECTIVE DEPICTION BY REDUCING PIXEL SIGNALS

BACKGROUND OF THE INVENTION

1. Field of the Invention

The present invention relates to an image pickup apparatus for use in an apparatus or a system arranged to record a still image or a moving image on a recording medium (such as a flash memory, a tape, etc.).

2. Description of Related Art

A digital still camera (a poly-pixel digital still camera) using a solid-state image sensor which has, for example, two million or more pixels (a poly-pixel CCD) has become available in the market.

The amount of data of an image picked up by a digital still camera increases accordingly as the number of pixels of the CCD used in the camera increases. The amount of data, however, sometimes becomes excessive for purposes, such as image communication or WWW (word wide web), other than printing purposes which require a large number of pixels.

Further, the digital still camera is arranged to record a picked-up image on a recording medium which is disposed within the camera. However, since the recording capacity of the recording medium is limited, the number of photo-taking frames has sometimes happened to decrease, becoming less than a specified number of frames.

To solve this problem, therefore, many of poly-pixel digital still cameras are arranged to have a mode of reducing signals of pixels outputted from the CCD and recording signals of the reduced number of pixels on the recording medium.

Meanwhile, in the case of a digital video camera, such as the so-called DV camera or the like, a signal to be recorded on the recording medium is set by standard specifications to a signal composed of a number of pixels defined by 720 pixels in the horizontal direction and 480 pixels in the vertical direction. If the CCD used in the digital video camera is a poly-pixel CCD, therefore, it is necessary to reduce signals of pixels outputted from the CCD and to record, on the recording medium, signals having the reduced number of pixels conforming to the standard.

Known methods for reducing the number of pixels in a digital still camera or a digital video camera (pixel signal reducing methods) include a method in which signals of all the pixels of the CCD are temporarily stored in a frame memory and, after that, a number-of-pixels converting action is performed by filtering to remove high-frequency components of the signals (hereinafter referred to as the number-of-pixels converting method), and another method in which signals of a necessary number of pixels are extracted from signals of pixels corresponding to a central portion of the image pickup plane of the CCD (hereinafter referred to as the central-portion extracting method).

The conventional image pickup apparatuses, such as the digital still camera, the digital video camera, etc., as mentioned above, however, are individually arranged to fixedly use only one of the number-of-pixels converting method and the central-portion extracting method.

Therefore, it has been impossible to attain a depth-of-field effect or to make effective depiction, etc., as desired according to the situation of photo-taking.

BRIEF SUMMARY OF THE INVENTION

It is an object of the invention to provide an image pickup apparatus which is capable of making an effective depiction by reducing pixel signals appositely to the photo-taking situation.

To attain the above object, in accordance with an aspect of the invention, there is provided an image pickup apparatus, comprising an image pickup circuit which photoelectrically converts, into pixel signals, a light image formed through a lens, and a setting controller which sets an image pickup mode selected from among a plurality of image pickup modes, the plurality of image pickup modes including at least a first mode in which the pixel signals obtained by the image pickup circuit are reduced by extracting pixel signals of a predetermined continuous area from the pixel signals obtained by the image pickup circuit, a second mode in which the pixel signals obtained by the image pickup circuit are reduced by thinning out the pixel signals obtained by the image pickup circuit according to a predetermined rule, and a third mode in which the pixel signals obtained by the image pickup circuit are not reduced more than in the first and second modes.

In addition, in accordance with another aspect of the invention, there is provided an image pickup apparatus, comprising an image pickup circuit which photoelectrically converts, into pixel signals, a light image formed through a lens, and a controller which performs control in such a way as to change, according to an object an image of which is to be picked up, a method of reducing the pixel signals obtained by the image pickup circuit.

In addition, in accordance with a further aspect of the invention, there is provided an image pickup method, comprising a photoelectric conversion step of photoelectrically converting, by an image pickup circuit, into pixel signals, a light image formed through a lens, and a setting step of setting an image pickup mode selected from among a plurality of image pickup modes, the plurality of image pickup modes including at least a first mode in which the pixel signals obtained by the image pickup circuit are reduced by extracting pixel signals of a predetermined continuous area from the pixel signals obtained by the image pickup circuit, a second mode in which the pixel signals obtained by the image pickup circuit are reduced by thinning out the pixel signals obtained by the image pickup circuit according to a predetermined rule, and a third mode in which the pixel signals obtained by the image pickup circuit are not reduced more than in the first and second modes.

In addition, in accordance with a further aspect of the invention, there is provided an image pickup method, comprising a photoelectric conversion step of photoelectrically converting, by an image pickup circuit, into pixel signals, a light image formed through a lens, and a control step of performing control in such a way as to change, according to an object an image of which is to be picked up, a method of reducing the pixel signals obtained by the image pickup circuit.

In addition, in accordance with a further aspect of the invention, there is provided a storage medium which stores therein, in a computer-readable manner, a processing program for executing a function of an image pickup apparatus having a photoelectric conversion circuit which photoelectrically converts, by an image pickup circuit, into pixel signals, a light image formed through a lens, the processing program having a setting code for setting an image pickup mode selected from among a plurality of image pickup modes, the plurality of image pickup modes including at least a first mode in which the pixel signals obtained by the image pickup circuit are reduced by extracting pixel signals of a predetermined continuous area from the pixel signals obtained by the image pickup circuit, a second mode in which the pixel signals obtained by the image pickup circuit are reduced by thinning out the pixel signals obtained by the image pickup circuit according to a predetermined rule, and a third mode in which the pixel signals obtained by the image pickup circuit are not reduced more than in the first and second modes.

In addition, in accordance with a further aspect of the invention, there is provided a storage medium which stores therein, in a computer-readable manner, a processing program for executing a function of an image pickup apparatus having a photoelectric conversion circuit which photoelectrically converts, by an image pickup circuit, into pixel signals, a light image formed through a lens, the processing program having a control code for performing control in such a way as to change, according to an object an image of which is to be picked up, a method of reducing the pixel signals obtained by the image pickup circuit.

With the arrangement as described above, the pixel signals can be reduced in a manner most apposite to the photo-taking situation for effective depiction.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 2A and 2B are diagrams showing a positional relation between an image sensor and a photo-taking lens in the digital video camera shown in FIG. 1.

FIGS. 3A, 3B and 3C are diagrams for explaining a change of a pixel signal reducing method according to the image pickup mode in the digital video camera shown in FIG. 1.

DETAILED DESCRIPTION OF THE INVENTION

Figure 1:
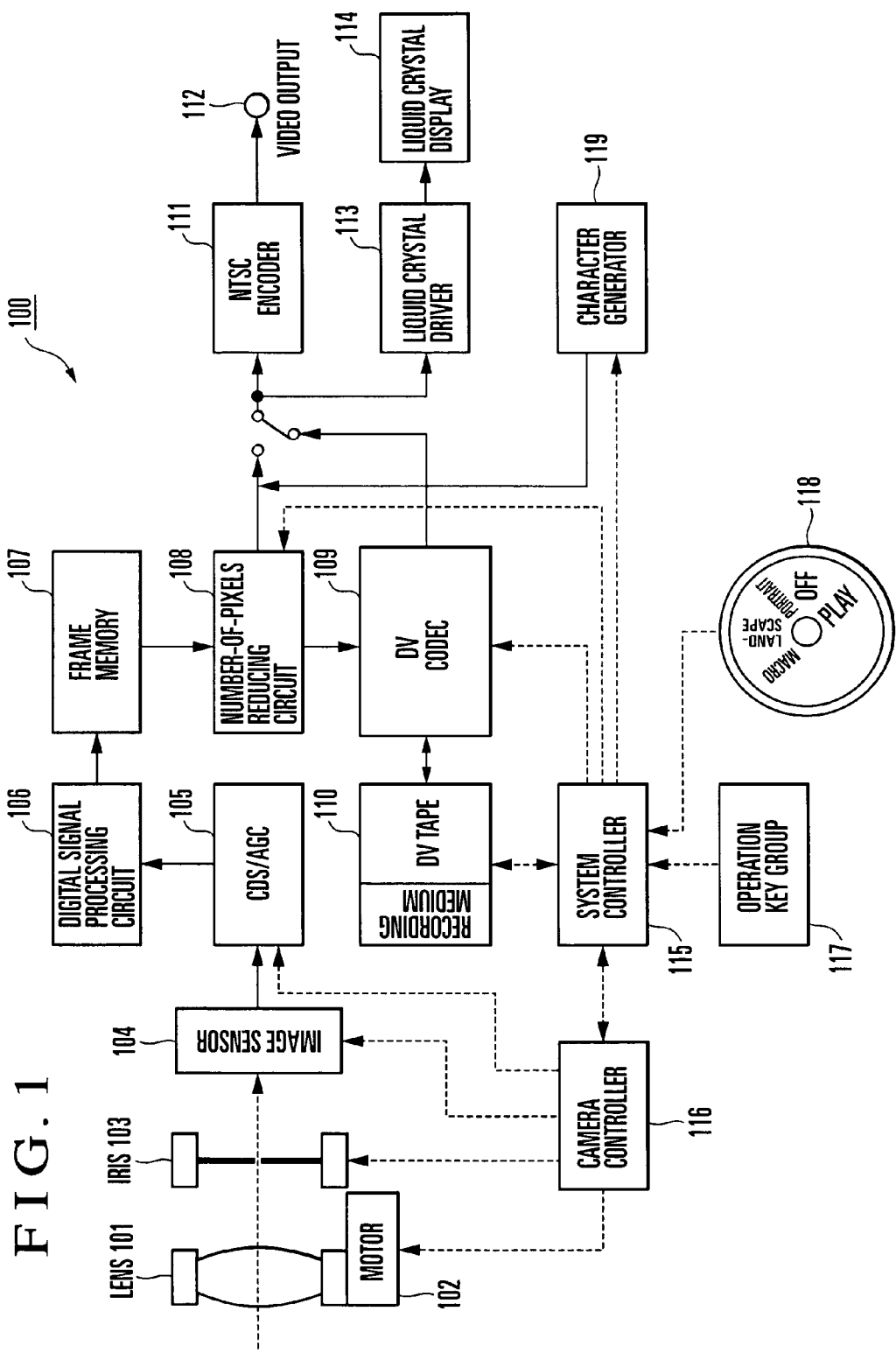
FIG. 1 is a block diagram showing the arrangement of a digital video camera according to a first embodiment of the invention.

Hereinafter, preferred embodiments of the invention will be described in detail referring to the drawings.

(First Embodiment)

The invention is applied, for example, to a digital video camera 100 arranged as shown in FIG. 1 according to a first embodiment of the invention.

Referring to FIG. 1, in the digital video camera 100, a photo-taking lens 101 is arranged to take in an image of an object of photo-taking. A lens driving motor 102 is arranged to drive the photo-taking lens 101 in such a way as to have the object image formed on the image pickup plane of an image sensor 104. An iris 103 is arranged to control the quantity of light coming to the image sensor 104. The image sensor 104 is arranged to convert, into an electrical image signal, the object image received through the photo-taking lens 101 and the iris 103 and to output the electrical image signal. A CDS/AGC circuit 105 is arranged to sample and hold the output signal of the image sensor 104 and to output the signal at an adequate level. A digital signal processing circuit 106 is arranged to digitize the output of the CDS/AGC circuit 105 which is an analog signal and to perform a digital signal processing action on the digital signal. A frame memory 107 is arranged to store one frame amount of the signal processed by the digital signal processing circuit 106 as raw data. The signal thus stored in the frame memory 107 is composed of pixel signals. A number-of-pixels reducing circuit 108 is arranged to reduce the pixel signals stored in the frame memory 107 in such a way as to make the pixel signals suited for recording in conformity with the DV system or for a video output through an NTSC encoder 111. A DV CODEC (coder-decoder) 109 is arranged to DV-compress, as a moving image signal, a signal composed of the pixel signals reduced by the number-of-pixels reducing circuit 108 and also to expand DV-compressed data recorded on a DV tape 110. The DV tape 110 is arranged to permit the signal DV-compressed by the DV CODEC 109 (the DV-compressed data) to be recorded thereon. The NTSC encoder 111 is arranged to output the signal processed by the digital signal processing circuit 106 (the raw data) as an NTSC image signal at the time of photo-taking and to output a signal expanded by the DV CODEC 109 as an NTSC image signal at the time of reproduction. A video output terminal 112 is provided for outputting to the outside the NTSC image signal from the NTSC encoder 111. A liquid crystal driver 113 is arranged to output to a liquid crystal display 114 the signal being subjected to the processing operation of the NTSC encoder 111. The liquid crystal display 114 is disposed on the body of the digital video camera 100. A camera controller 116 is arranged to control focusing of the photo-taking lens 101 and other camera actions related to an exposure, etc. An operation key group 117 is provided to enable the user to operate the digital video camera 100. A mode dial 118 is provided for setting an image pickup mode according to the photo-taking object an image of which is to be picked up. A character generator 119 is arranged to generate character information to be superposed on the signal sent to the liquid crystal display 114 or to the video output terminal 112. A system controller 115 is arranged to preside over the control of actions of the whole digital video camera 100 including the number-of-pixels reducing circuit 108, in accordance with operations on the operation key group 117. In the case of the first embodiment, the number-of-pixels reducing circuit 108 is arranged to reduce the pixel signals stored in the frame memory 107. The arrangement, however, may be changed to reduce the pixel signals within the image sensor 104.

In the case of the digital video camera 100 arranged as described above, the image pickup plane of the image sensor 104 is arranged to have, for example, 1280×960 pixels.

FIGS. 2A and 2B show a positional relation between the photo-taking lens 101 and the image sensor 104, which varies according to the image pickup mode. FIGS. 3A, 3B and 3C show patterns in which the image formed on the image sensor 104 is taken in according to the image pickup mode, i.e., patterns for the pixel signal reducing methods.

The digital video camera 100 according to the first embodiment operates as described below with reference to FIG. 1 through FIGS. 3A to 3C.

The user first operates the mode dial 118 to set one of the image pickup modes according to the purpose of photo-taking. In the case of the first embodiment, for example, as a small-image-plane image pickup mode of forming a moving image (a reduced image) composed of a smaller number of pixels than the total number of pixels provided on the image sensor 104, there are two image pickup modes, i.e., a "PORTRAIT" mode and a "LANDSCAPE" mode. These modes are provided correspondingly with different predetermined exposure conditions.

With the image pickup mode, i.e., the "PORTRAIT" mode or the "LANDSCAPE" mode, set by the user, the camera controller 116 begins to control the actions of the lens driving motor 102 which drives the photo-taking lens 101, the iris 103, the image sensor 104, the CDS/AGC circuit 105, etc.

In particular, the camera controller 116 adjusts, as shown in FIGS. 2A and 2B, the focal length of the photo-taking lens 101 to a focal length f1 or f2 through the zoom function of the photo-taking lens 101 in such a way as not to vary a photo-taking angle of view between when the "PORTRAIT" mode is set and when the "LANDSCAPE" mode is set as the image pickup mode, as will be further described in detail later herein.

Under the control of the camera controller 116, an object image obtained through the photo-taking lens 101 and the iris 103 is formed on the image pickup plane of the image sensor 104. The object image thus formed is photoelectrically converted by the image sensor 104 into an electrical signal, which is composed of pixel signals. The electrical signal is stored in the frame memory 107 through the CDS/AGC circuit 105 and the digital signal processing circuit 106.

Therefore, signals of a number of pixels owned by the image sensor 104 (pixel signals of 1280×960 pixels) are eventually stored in the frame memory 107.

In this instance, if the image pickup mode is set to the "PORTRAIT" mode (small-image-plane image pickup mode) by the mode dial 118, the number-of-pixels reducing circuit 108 obtains data corresponding to pixel signals of 640×480 pixels from among the pixel signals of 1280×960 pixels stored in the frame memory 107, by using, as an effective pixel (a pixel illustrated with a black square in FIG. 3B), only one pixel within each of pixel blocks each of which is composed of four pixels including 2 vertical pixels×2 horizontal pixels, as shown in FIG. 3B.

After that, the DV CODEC 109 converts the image data of 640×480 pixels obtained by the number-of-pixels reducing circuit 108 into image data of 720×480 pixels according to a specified DV recording size. The image data thus converted is compressed in accordance with a specified DV compressing method. The image data thus compressed is recorded on the DV tape 110.

In the first embodiment, in the case of the "PORTRAIT" mode, the number-of-pixels reducing circuit 108 uses, as an effective pixel, only one pixel of each pixel block composed of four pixels including 2 vertical pixels×2 horizontal pixels. This arrangement may be changed, for example, to obtain the mean value of the four pixels of each block and to use the mean value as the value of the effective pixel of the block. In other words, the method of reducing the pixel signals obtained by the image sensor is not limited to the above-stated method of thinning out the pixel signals. The arrangement may be changed to add together the pixel signals which correspond to a plurality of pixels.

Further, it is possible to arrange the image data thinning-out pattern to vary with lines of a pixel array or to arrange every line to have a different image-data-thinning-out pattern from other lines.

In a case where the image pickup mode is set to the "LANDSCAPE" mode (small-image-plane image pickup mode) by the mode dial 118, the number-of-pixels reducing circuit 108 obtains image data corresponding to pixel signals of 640×480 pixels from among the pixel signals of 1280×960 pixels stored in the frame memory 107, by using, as effective pixels (pixels illustrated with black squares in FIG. 3C), the pixel signals of 640×480 pixels which are located at the central part of the pixel signals of 1280×960 pixels, as shown in FIG. 3C.

After that, the DV CODEC 109 converts the image data of 640×480 pixels obtained by the number-of-pixels reducing circuit 108 into image data of 720×480 pixels according to the specified DV recording size. The image data thus converted is compressed in accordance with the specified DV compressing method. The image data thus compressed is recorded on the DV tape 110.

As described in the foregoing, in the first embodiment, with the image pickup mode set to the "PORTRAIT" mode, one effective pixel is obtained from every block composed of four pixels with respect to all the pixel signals outputted from the image sensor 104 (see FIG. 3B). Therefore, such an image that is composed of signals of all the pixels of the image sensor 104 usable as image data is reduced to an image of a specified DV recording size. In a case where the image pickup mode is set to the "LANDSCAPE" mode, on the other hand, effective pixels are obtained from the central part of all the pixel signals outputted from the image sensor 104 (see FIG. 3C). Therefore, such an image that is composed of signals of all the pixels of the image sensor 104 usable as image data is reduced, for example, to a specified DV recording size. In other words, the first embodiment is arranged to obtain an image reduced to a specified DV recording size by varying the method of selecting effective pixels (the pixel signal reducing method) according to the small-image-plane image pickup mode selected.

Further, a photo-taking angle of view is arranged not to vary between when the "PORTRAIT" mode is set and when the "LANDSCAPE" mode is set. This arrangement gives at least the following advantage.

FIG. 2A shows a positional relation obtained between the photo-taking lens 101 and the image sensor 104 when the "PORTRAIT" mode is set (in the case of the pixel signal reducing method shown in FIG. 3B). FIG. 2B shows a positional relation obtained between the photo-taking lens 101 and the image sensor 104 when the "LANDSCAPE" mode is set (in the case of the pixel signal reducing method shown in FIG. 3C).

As shown in FIGS. 2A and 2B, the angle of view obtained when the image pickup mode is set to the "PORTRAIT" mode (in the case of the pixel signal reducing method shown in FIG. 3B) remains unchanged when the image pickup mode is set to the "LANDSCAPE" mode (in the case of the pixel signal reducing method shown in FIG. 3C), because the focal length is automatically adjusted to the focal length f1 or f2 by the zoom function of the photo-taking lens 101 under the control of the above-stated camera controller 116.

However, since the focal length f1 obtained in the "POR-TRAIT" mode is longer than the focal length f2 in the "LANDSCAPE" mode, the depth of field is shallower in the "PORTRAIT" mode than in the "LANDSCAPE" mode.

In other words, photo-taking in the "PORTRAIT" mode permits depiction to have blurring and is thus advantageous for taking a portrait shot or the like. On the other hand, photo-taking in the "LANDSCAPE" mode permits depiction to have the whole picture in focus and is thus advantageous for taking a landscape picture or the like.

Therefore, according to the arrangement of the first embodiment, an optimum effect of depth of field can be attained according to the purpose of picking up a moving image.

Further, the shift of the "PORTRAIT" mode (small-image-plane image pickup mode) to the "LANDSCAPE" mode (small-image-plane image pickup mode) may be arranged to be made in the following manner. A control action on a zoom lens according to a desired focal length and a control action on the area, i.e., the size, of an image reading region are continuously and correlatively performed. According to such an arrangement, the depth of field can be changed as desired in a state of having an image-pickup angle of view kept constant. In other words, a background image can be blurred as desired while the central object is kept in focus.

(Second Embodiment)

Figure 4:
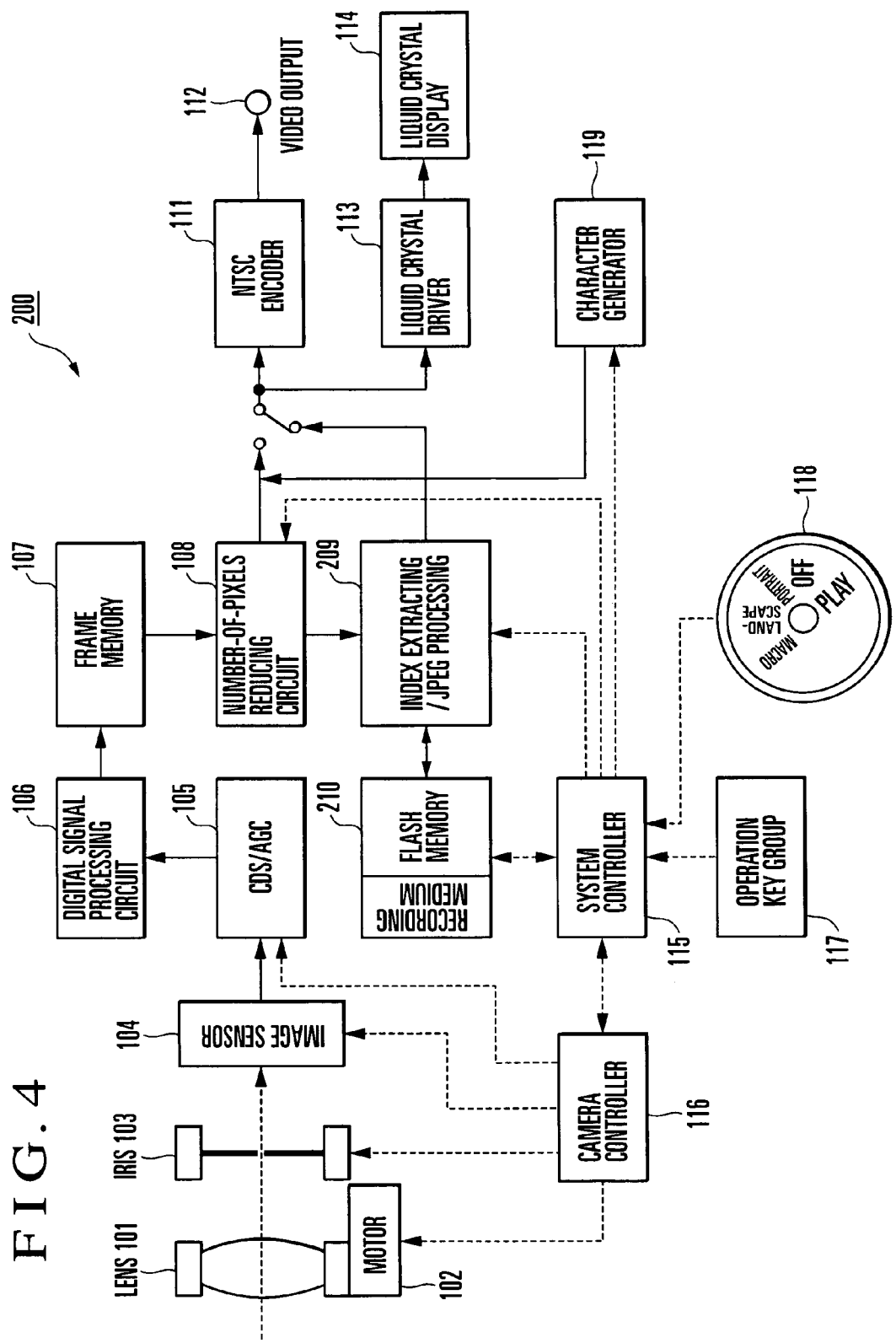
FIG. 4 is a block diagram showing the arrangement of a digital still camera according to a second embodiment of the invention.

The invention is applied to a digital still camera 200 arranged, for example, as shown in FIG. 4, according to a second embodiment of the invention.

The digital still camera 200 is arranged in the same manner as the digital video camera 100 shown in FIG. 1 except that the DV CODEC 109 and the DV tape 110 shown in FIG. 1 are replaced respectively with a JPEG (joint photographic coding experts group) processing circuit 209 and a flash memory 210.

In the digital still camera 200 shown in FIG. 4, all parts that act in the same manner as those of the digital video camera 100 shown in FIG. 1 are denoted by the same reference numerals, and the details of them are omitted from the following description in the second embodiment, which covers only the difference of the arrangement from the first embodiment.

The JPEG processing circuit 209 compresses, with the JPEG coding method, the output signal (digital image signal) of the number-of-pixels reducing circuit 108 as a still image and records the compressed digital image signal in the flash memory 210.

The JPEG processing circuit 209 is also arranged to extract an index image signal from a signal processed by the digital signal processing circuit 106, as will be described later herein.

Further, the JPEG processing circuit 209 is arranged to expand the JPEG-compressed data recorded in the flash memory 210.

The NTSC encoder 111, which is disposed in the rear stage of the JPEG processing circuit 209, is arranged to output, as an NTSC image signal, the signal processed by the digital signal processing circuit 106 at the time of photo-taking and, at the time of reproduction, to output the signal expanded by the JPEG processing circuit 209 as an NTSC image signal.

Further, in the case of the second embodiment, for example, as a small-image-plane image pickup mode of forming a still image (a reduced image) composed of a smaller number of pixels than the total number of pixels usable by the image sensor 104 for obtaining image data, there are two image pickup modes, i.e., a "PORTRAIT" mode and a "LANDSCAPE" mode. In addition, as a whole-image-plane image pickup mode of forming a still image with all the pixels usable by the image sensor 104 for obtaining image data, there is a "LARGE" mode. These modes are provided correspondingly with different predetermined exposure conditions.

The operation of the digital still camera 200 is described below referring to FIGS. 2A and 2B and FIGS. 3A to 3C, which have been used for describing the first embodiment, along with FIG. 4.

Photo-taking begins with an image pickup mode set by the user in the same manner as in the case of the first embodiment. An object image is formed on the image pickup plane of the image sensor 104 through the photo-taking lens 101 and the iris 103 under the control of the camera controller 116. The object image is photoelectrically converted into an electrical signal by the image sensor 104. The electrical signal is stored in the frame memory 107 through the CDS/AGC circuit 105 and the digital signal processing circuit 106. As a result, pixel signals corresponding to 1280×960 pixels owned by the image sensor 104 are stored in the frame memory 107.

In addition, the camera controller 116 adjusts, as shown in FIGS. 2A and 2B, the focal length of the photo-taking lens 101 to a focal length f1 or f2 through the zoom function of the photo-taking lens 101 in such a way as not to vary a photo-taking angle of view between when the "PORTRAIT" mode is set and when the "LANDSCAPE" mode is set as the image pickup mode.

In this instance, if the image pickup mode is set to the "LARGE" mode by the operation of the mode dial 118, the number-of-pixels reducing circuit 108 obtains image data corresponding to pixel signals of 1280×960 pixels stored in the frame memory 107 by using all the 1280×960 pixels of the image sensor 104 as effective pixels, as shown in FIG. 3A.

Meanwhile, the reduction in number of pixels to be used by the NTSC encoder 111 for obtaining an NTSC image signal (video signal) is arranged to be always carried out irrespective of the image-pickup-mode set by the mode dial 118.

After that, the JPEG processing circuit 209 compresses, with the JPEG coding method, the image data of 1280×960 pixels obtained by the number-of-pixels reducing circuit 108 and records the compressed image data in the flash memory 210.

In a case where the image pickup mode is set either to the "PORTRAIT" mode or the "LANDSCAPE" mode, as in the first embodiment, the number-of-pixels reducing circuit 108 obtains image data corresponding to pixel signals of 640×480 pixels from among the pixel signals of 1280×960 pixels stored in the frame memory 107, by the pixel signal reducing method shown in FIG. 3B or 3C according to the image pickup mode set.

After that, the JPEG processing circuit 209 compresses, with the JPEG coding method, the image data of 640×480 pixels obtained by the number-of-pixels reducing circuit 108 and records the compressed image data in the flash memory 210.

With the second embodiment arranged in the manner described above, a still image can be obtained by taking advantage of blurring in the "PORTRAIT" mode, while a still image can be obtained in the "LANDSCAPE" mode to have the whole image in focus, as in the case of the first embodiment described in the foregoing.

According to the arrangement of the second embodiment, therefore, an optimum effect of depth of field can be attained according to the purpose of taking a still image.

(Third Embodiment)

Figure 5:
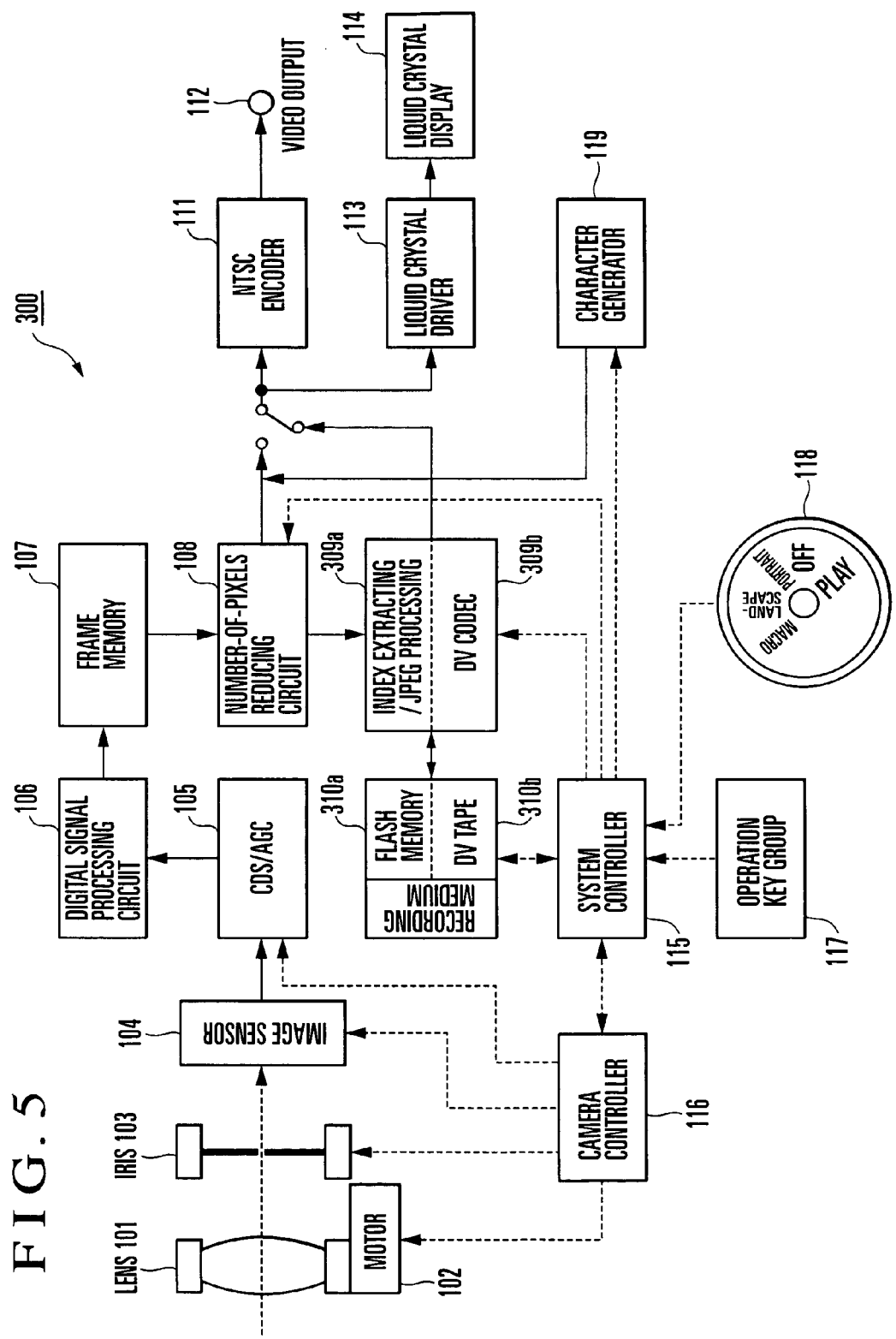
FIG. 5 is a block diagram showing the arrangement of a digital video camera according to a third embodiment of the invention.

The invention is applied to a digital video camera 300 arranged, for example, as shown in FIG. 5 according to a third embodiment of the invention.

The digital video camera 300 is arranged in the same manner as the digital video camera 100 shown in FIG. 1 except that the DV CODEC 109 and the DV tape 110 shown in FIG. 1 are replaced respectively with a DV CODEC 309*b*, which functions in the same manner as the DV CODEC 109, and a JPEG processing circuit 309*a*, which functions in the same manner as the JPEG processing circuit 209 shown in FIG. 4, a DV tape 310*b* (a recording medium for recording moving images), which is similar to the DV tape 310*b*, and a flash memory 310*a* (a recording medium for recording still images), which is similar to the flash memory 210 shown in FIG. 4.

In the digital video camera 300 shown in FIG. 5, all parts that act in the same manner as those of the digital video camera 100 shown in FIG. 1 are denoted by the same reference numerals, and the details of them are omitted from the following description, which covers only the difference of the arrangement of the third embodiment from the first and second embodiments described in the foregoing.

The NTSC encoder 111, which is disposed in the rear stage of the JPEG processing circuit 309*a* and the DV CODEC 309*b*, is arranged to output, as an NTSC image signal, a signal processed by the digital signal processing circuit 106 at the time of photo-taking and to output, at the time of reproduction, a signal expanded by the JPEG processing circuit 309*a* or a signal expanded by the DV CODEC 309*b* as an NTSC image signal.

Further, in the case of the third embodiment, for example, as a small-image-plane image pickup mode of forming a moving image (a reduced image) composed of a smaller number of pixels than the total number of pixels usable by the image sensor 104 for obtaining image data, there are two image pickup modes, i.e., a "PORTRAIT" mode and a "LANDSCAPE" mode. In addition, as a whole-image-plane image pickup mode of forming a still image with all the pixels usable by the image sensor 104 for obtaining image data, there is a "PHOTO" mode. These modes are provided correspondingly with different predetermined exposure conditions.

The operation of the digital video camera 300 is described below referring to FIG. 5 together with FIGS. 2A and 2B and FIGS. 3A to 3C, which have been used for describing the first and second embodiments in the foregoing.

Photo-taking begins with an image pickup mode set by the user in the same manner as in the case of the first and second embodiments. An object image is formed on the image pickup plane of the image sensor 104 through the photo-taking lens 101 and the iris 103 under the control of the camera controller 116. The object image is photoelectrically converted into an electrical signal by the image sensor 104. The electrical signal is stored in the frame memory 107 through the CDS/AGC circuit 105 and the digital signal processing circuit 106. As a result, pixel signals corresponding to 1280×960 pixels owned by the image sensor 104 are stored in the frame memory 107.

In addition, the camera controller 116 adjusts, as shown in FIGS. 2A and 2B, the focal length of the photo-taking lens 101 to a focal length f1 or f2 through the zoom function of the photo-taking lens 101 in such a way as not to vary a photo-taking angle of view between when the "PORTRAIT" mode is set and when the "LANDSCAPE" mode is set as the image pickup mode.

In this instance, if the image pickup mode is set to the "PHOTO" mode by the operation of the mode dial 118, the number-of-pixels reducing circuit 108 obtains image data corresponding to pixel signals of 1280×960 pixels stored in the frame memory 107 by using all the 1280×960 pixels of the image sensor 104 as effective pixels, as shown in FIG. 3A, in the manner similar to a case where the "LARGE" mode is set in the second embodiment.

In other words, a reduction in number of pixels for recording is not made in the case of the "PHOTO" mode.

After that, the JPEG processing circuit 309*a* compresses, with the JPEG coding method, the image data of 1280×960 pixels obtained by the number-of-pixels reducing circuit 108 and records the compressed image data in the flash memory 310*a*.

In a case where the image pickup mode is set to the "PORTRAIT" mode, the number-of-pixels reducing circuit 108 obtains image data corresponding to pixel signals of 640×480 pixels from among the pixel signals of 1280×960 pixels stored in the frame memory 107 by the pixel signal reducing method shown in FIG. 3B, in the manner similar to a case where the "PORTRAIT" mode is set in the first embodiment.

After that, the DV CODEC 309*b* converts, with the compression method specified for the DV recording, the image data of 640×480 pixels obtained by the number-of-pixels reducing circuit 108 into image data of 720×480 pixels which are a recording size specified for the DV recording, and records the compressed image data on the DV tape 310*b*.

Further, in a case where the image pickup mode is set to the "LANDSCAPE" mode, the number-of-pixels reducing circuit 108 obtains image data corresponding to pixel signals of 640×480 pixels from among the pixel signals of 1280×960 pixels stored in the frame memory 107 by the pixel signal reducing method shown in FIG. 3C, in the manner similar to a case where the "LANDSCAPE" mode is set in the first embodiment.

After that, the DV CODEC 309*b* converts, with the compression method specified for the DV recording, the image data of 640×480 pixels obtained by the number-of-pixels reducing circuit 108 into image data of 720×480 pixels which are a recording size specified for the DV recording, and records the compressed image data on the DV tape 310*b*.

With the third embodiment arranged in the manner described above, as in the case of the first embodiment, photo-taking in the "PORTRAIT" mode permits depiction to have blurring and is thus advantageous for taking a portrait shot or the like. On the other hand, photo-taking in the "LANDSCAPE" mode permits depiction to have the whole picture in focus and is thus advantageous for taking a landscape picture or the like.

Therefore, according to the arrangement of the third embodiment, an optimum effect of depth of field can be attained according to the purpose of picking up a moving image.

Further, the shift of the "PORTRAIT" mode (small-image-plane image pickup mode) to the "LANDSCAPE" mode (small-image-plane image pickup mode) may be arranged to be made in the following manner. A control action on a zoom lens according to a focal length and a control action on the area (size) of an image reading region are continuously and correlatively performed. In that case, for example, only one pixel of each block composed of four pixels including 2 vertical pixels×2 lateral pixels is used as an effective pixel or a mean value of the four pixels of each block is used as the value of the effective pixel in reducing image data. According to such an arrangement, the depth of field can be changed as desired while keeping an image-pickup angle of view constant. In other words, a background image can be blurred as desired while the central object is kept in focus.

(Fourth Embodiment)

The invention is applied to the digital video camera 300 arranged, for example, as shown in FIG. 5 and described in the third embodiment, according to a fourth embodiment of the invention. In the case of the fourth embodiment, a distance to the object of photo-taking is measurable at any of a plurality of distance measuring points as described later herein.

Figure 6:
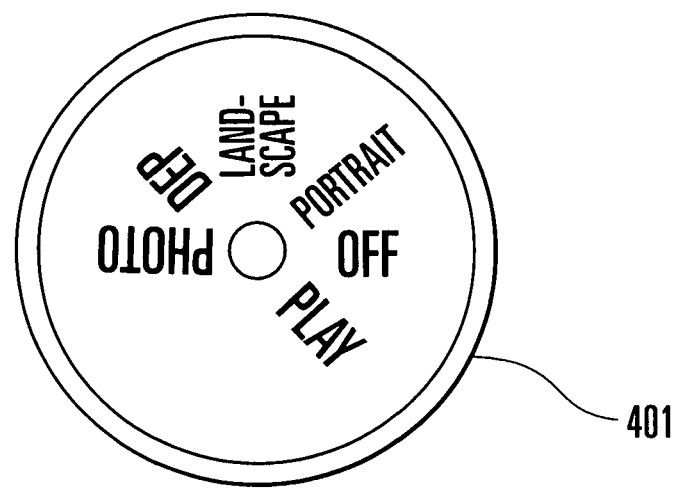
FIG. 6 is a diagram showing a mode dial of a digital video camera according to a fourth embodiment of the invention.

In the case of the fourth embodiment, the digital video camera differs from the digital video camera shown in FIG. 5 in that the mode dial 118 is changed to a mode dial 401 which is shown in FIG. 6. With the exception of the mode dial 401, all component parts of the fourth embodiment that act in the same manner as those of the third embodiment are denoted by the same reference numerals that are used in FIG. 5, and the details of them are omitted from the following description, which covers only the points of the arrangement where the fourth embodiment differs from the first to third embodiments.

As indicated on the mode dial 401 shown in FIG. 6, in the fourth embodiment, the image pickup modes include a "PHOTO" mode, a "PORTRAIT" mode, a "LANDSCAPE" mode and a "DEP" mode.

The digital video camera according to the fourth embodiment operates in the same way as the digital video camera described above as the third embodiment, when the mode dial 401 is set to any one of the "PHOTO" mode, the "PORTRAIT" mode and the "LANDSCAPE" mode.

Figure 7:
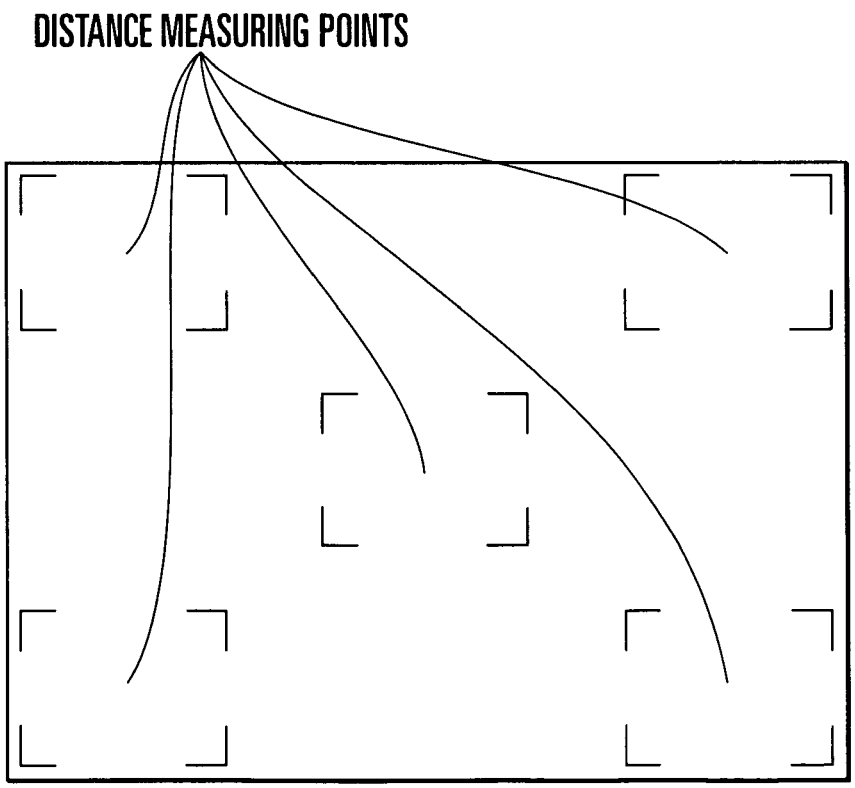
FIG. 7 is a diagram showing distance measuring points in the fourth embodiment.

In the "DEP" mode, a moving image is recorded on the DV tape 310b in the same manner as in the "PORTRAIT" mode and the "LANDSCAPE" mode. In the "DEP" mode, a distance measuring action is performed by using distance measuring points shown in FIG. 7. In the distance measuring action, the spatial frequency of an image is detected to obtain an evaluation value which indicates the rate of a high-frequency component in the spatial frequency. The camera controller 116 is provided with an automatic focusing means for finely adjusting the focus position of the photo-taking lens 101 along the optical axis to a point where the evaluation value becomes maximum. This point is decided to be an in-focus point. More particularly, the fourth embodiment is arranged to have five distance measuring points and to consider one of the five distance measuring points where the evaluation value becomes maximum to be an in-focus point.

Figure 9:
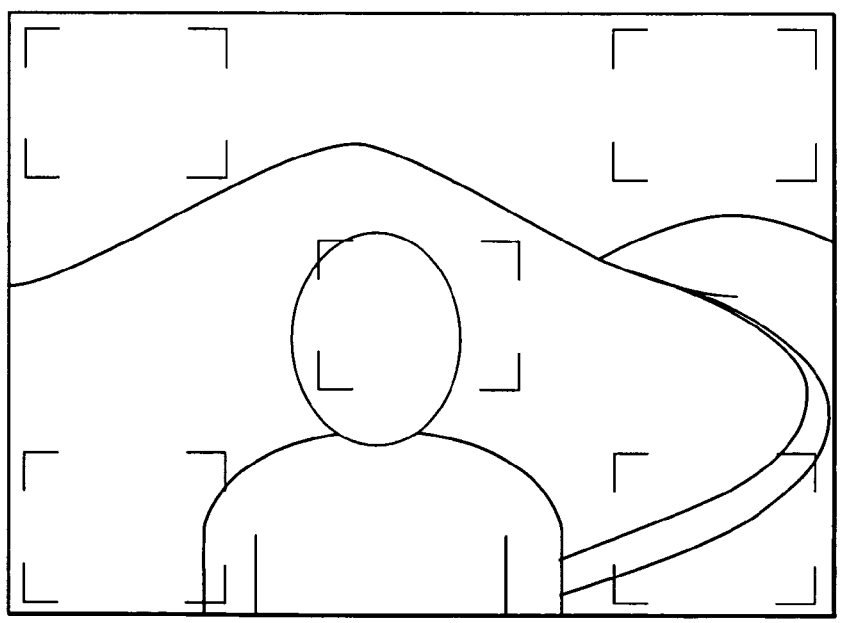
FIG. 9 is a diagram showing, by way of example, an outdoor photo-taking shot taken in the fourth embodiment.
Figure 10A:
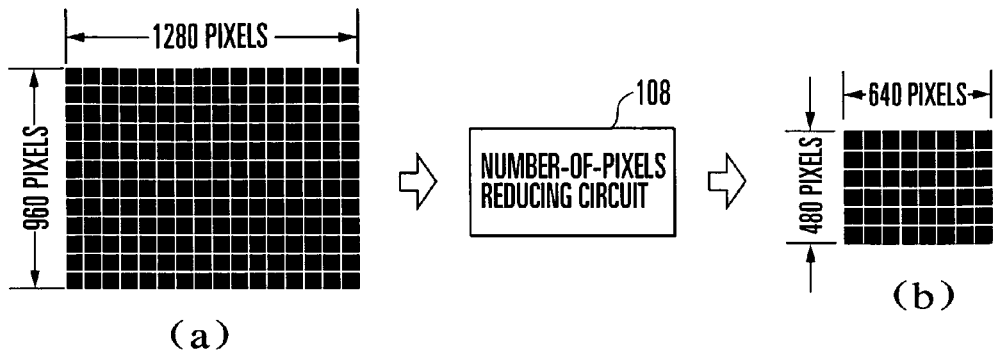
FIGS. 10A, 10B and 10C are diagrams showing examples of the change of effective pixels in the fourth embodiment.
Figure 10B:
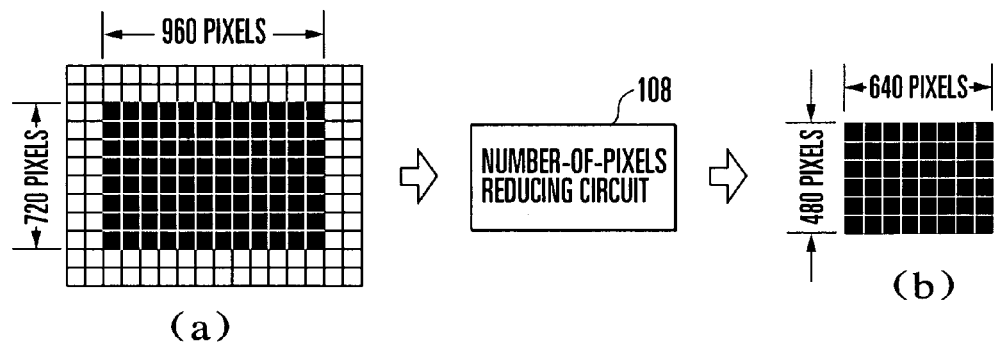
Figure 10C:
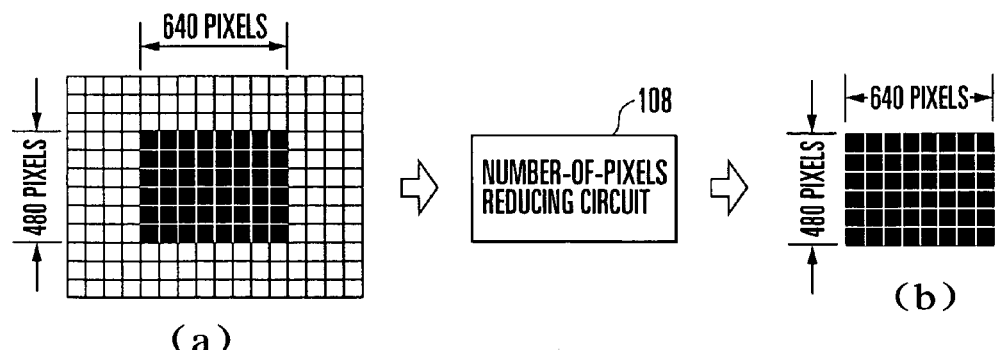
Figure 11:
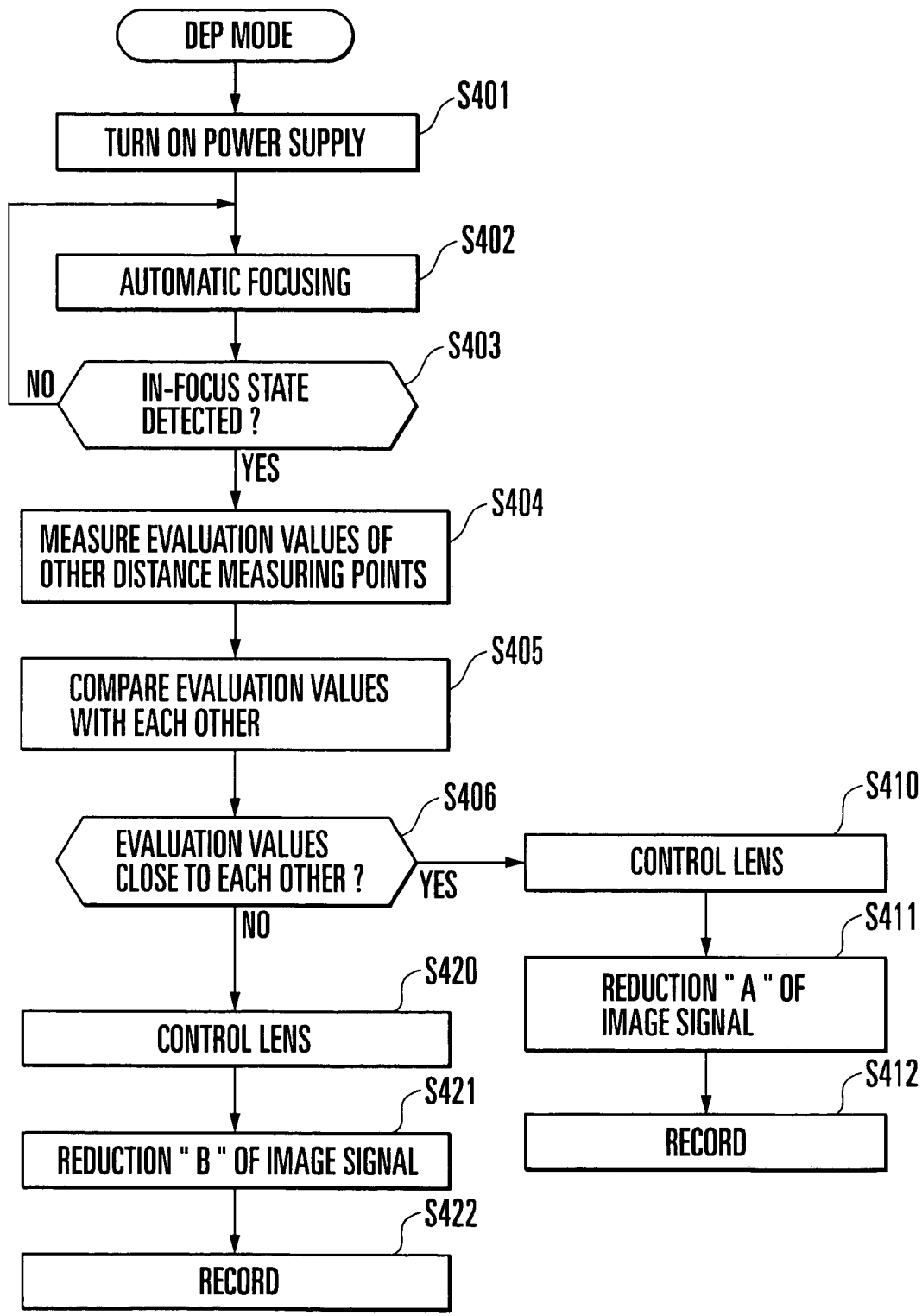
FIG. 11 is a flow chart showing an operation of the digital video camera according to the fourth embodiment.

The operation of the digital video camera 300 according to the fourth embodiment is described referring to FIG. 11, which is a flow chart, and to FIG. 5 together with FIGS. 2A and 2B and FIGS. 3A to 3C, which have been used for describing the first, second and third embodiments in the foregoing, and also referring further to FIG. 6 to FIGS. 10A to 10C.

Referring to FIG. 11, the power supply of the camera body turns on, at step S401, when the mode dial 401 is set to the position of the "DEP" mode. Then, the image sensor 104 is subjected to a reducing process shown in FIG. 10B. In the fourth embodiment, at step S402, an automatic focusing action is initiated by the camera controller 116. Here, in the state shown in FIG. 10B, 960×720 pixels are set as effective pixels among the all the pixels of the image sensor 104. The 960×720 effective pixels are further subjected to a reducing process at the number-of-pixels reducing circuit 108. As a result, an image picked up is recorded on the DV tape in a state where the pixels of the image have been reduced to 640×480 pixels.

Figure 8:
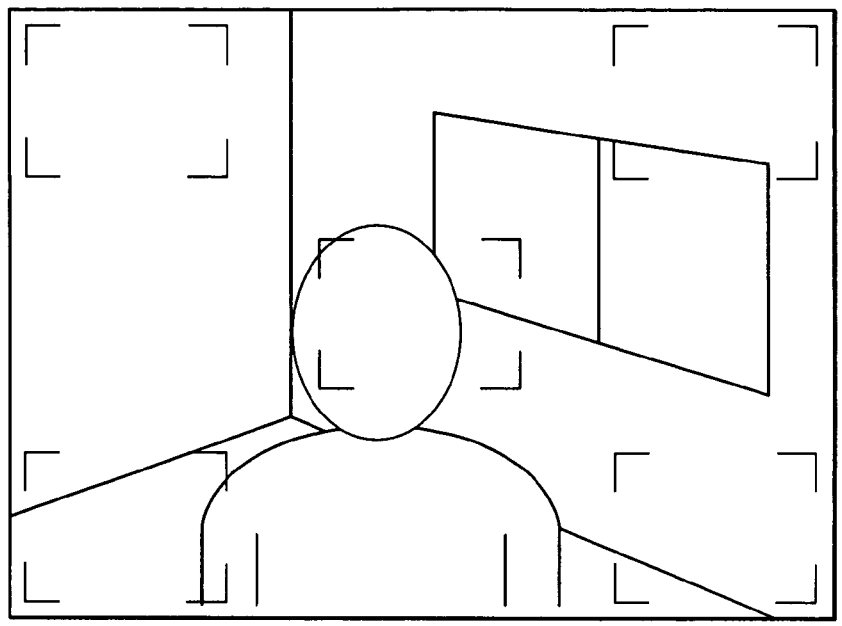
FIG. 8 is a diagram showing, by way of example, an indoor photo-taking shot taken in the fourth embodiment.

At step S403, a check is made by the camera controller 116 to find if at least one of the distance measuring points is detected to be an in-focus state. If so, the flow of operation proceeds to step S404. At the step S404, evaluation values of the other distance measuring points are measured. At step S405, the measured evaluation values are compared with each other. In a case where none of the distance measuring points is found at the step S403 to be in an in-focus state, the automatic focusing action and the distance measuring action are repeated until at least one of the distance measuring points is detected to be an in-focus state. A process for comparing the above-stated evaluation values is next described. FIG. 8 shows a case where a distance between a main photo-taking object located in the central portion and the background of the object is short, as in the case of indoor photo-taking. In such a case, the evaluation values obtained from the four peripheral distance measuring points are closer to an evaluation value obtained from a distance measuring point located at the center of the image plane than in the case of FIG. 9.

In the case of FIG. 8, the state of effective pixels of the image sensor 104 becomes as shown in FIG. 10A. FIG. 10A shows a state in which 1280×960 pixels are used as effective pixels for image data. In this case, the flow of operation proceeds from the step S406 to step S411 through step S410 which is provided for lens control. At the step S411, the 1280×960 pixels are reduced and thinned out to image data of 640×480 pixels by the number-of-pixels reducing circuit 108 in a manner as described in the foregoing description of the first, second and third embodiments. After that, the flow of operation proceeds to step S412 for recording on the DV tape. In this case, the range of effective pixels is wider than in the state of FIG. 10B. Therefore, the angle of view of the video image must be broadened as much as the wider spread portion of the effective pixel range. However, the wider portion can be offset, at the step S410, to retain the initial angle of view of the video image through the zoom function of the photo-taking lens 101 by shifting the position of the photo-taking lens 101 toward a telephoto end position.

With the zoom lens, i.e., the photo-taking lens 101, caused to act in the above manner, the depth of field becomes shallower to enable the fourth embodiment to effectively cope with such a situation that the photo-taking object has a background at a short distance as in the case of indoor photo-taking.

In a case where a main object of photo-taking has a background at a long distance as in the case of outdoor photo-taking as shown in FIG. 9, on the other hand, the evaluation values obtained from the four peripheral distance measuring points much differ from the evaluation value obtained from the distance measuring point located at the center of the image plane being checked for an in-focus state, as compared with the case shown in FIG. 8.

In the case of FIG. 9, the effective pixels of the image sensor 104 become as shown in FIG. 10C. FIG. 10C shows a case where 640×480 pixels are used as effective pixels among all the available pixels of the image sensor 104. In this case, the flow of operation proceeds from the step S406 to step S421 through step S420. At the step S421, the number-of-pixels reducing circuit 108 takes out the reduced number of pixel signals in the same manner as stated in the foregoing description of the first, second and third embodiments without thinning down the image data. After the step S421, the flow proceeds to step S422 to record the image data on the DV tape as it is. The number of effective pixels becomes smaller than the state shown in FIG. 10B. Therefore, the angle of view of the video image must be narrowed as much as the difference in the number of effective pixels. However, the narrower spread portion can be offset, at the step S420, to retain the initial angle of view of the video image through the zoom function of the photo-taking lens 101 by shifting the position of the photo-taking lens 101 toward a wide-angle end position.

With the zoom lens, i.e., the photo-taking lens 101, caused to act in the above manner, the depth of field becomes deeper to enable the fourth embodiment to effectively cope with such a situation that the photo-taking object has a background at a long distance as in the case of outdoor phototaking.

The distance measuring action is arranged to be performed on the images (b) obtained after the number-of-pixels reducing processes which are performed as shown in FIGS. 10A, 10B and 10C. Therefore, the positions of the distance measuring points are not affected by the change of effective pixels and thus remain unvarying with respect to an image to be recorded.

In the case of the fourth embodiment, the positions of the distance measuring points are arranged to have one point in a central area and four points in peripheral areas. This arrangement may be variously changed, for example, to have five distance measuring points horizontally aligned in one row in the middle part of the image plane, or to reduce the five distance measuring points to three distance measuring points, or the like.

The fourth embodiment is arranged to have three ranges of effective pixels as shown in FIGS. 10A, 10B and 10C. The arrangement, however, may be variously changed. For example, the ranges may be arranged to be continuously variable from one range to another. Further, the zoom lens may be arranged to be capable of continuously acting in such a way as to offset the results of changes of effective pixels. In the case of such modification, a shift of the state of FIG. 11A to the state of FIG. 10C may be effected in the following manner. The control of the zoom lens according to the focal length and the control over the image reading area are arranged to be performed in a continuously correlated manner. By such an arrangement, the depth of field can be changed while the image pickup angle of view is kept constant. In other words, a background image may be intentionally blurred as desired while an in-focus state is kept for a main object located in the central part of an image plane.

According to the arrangement of the fourth embodiment, as described above, the way in which the effective pixels are obtained varies according to the image pickup mode. The arrangement permits the user to attain an effect of depth of field most apposite to the photo-taking purpose. In other words, according to the arrangement of the fourth embodiment, the way in which effective pixels are obtained varies with the image pickup mode selected, so that an optimum effect of depth of field is attainable according to the purpose of photo-taking. The arrangement for setting the image pickup mode according to a combination of an aperture value and a shutter speed makes depiction with the fourth embodiment more effective according to the purpose of photo-taking.

Further, the arrangement for detecting the depth of field by comparing the results of distance measurement effectively facilitates the setting of the image pickup mode.

It goes without saying that the object of the invention can be attained also by providing a system or an apparatus with a storage medium which stores therein program codes of software for executing the functions of each of the first to fourth embodiments. In that case, a computer (or a CPU or an MPU) of such a system or an apparatus can carry out the functions by reading the program codes out from the storage medium.

In that case, the program codes themselves read out from the storage medium represent the functions of each of the above-described embodiments, and the storage medium which stores the program codes therein is considered to constitute the invention.

The storage medium for supplying the program codes can be selected from among various media such as a ROM, a floppy disk, a hard disk, an optical disk, a magneto-optical disk, a CD-ROM, a CD-R, a magnetic tape, a nonvolatile memory card, etc.

The functions of each embodiment disclosed not only can be carried out by a computer by reading out the program codes but also can be carried out in part or in their entirety by an OS (operating system) or the like working on the computer under the instructions of the program codes.

The functions of each embodiment disclosed also may be carried out in the following manner. With the program codes read out from a storage medium, the program codes are written into a function expanding board which is inserted into a computer or into a function expanding unit which is connected to the computer. After that, the functions are carried out in part or in their entirety by a CPU or the like provided on the function expanding board or the function expanding unit.

The arrangement of each embodiment described in the foregoing enables the user to make a more effective depiction according to the purpose of photo-taking.

The invention claimed is:

1. An image pickup apparatus, comprising:
an image pickup circuit which photoelectrically converts, into pixel signals, a light image formed through a lens;
a setting unit which sets at least a first image pickup mode and a second image pickup mode; and
a controlling unit which controls to lengthen a focal length of said lens depending on a change from said first image pickup mode to said second image pickup mode,
wherein, said first image pickup mode reduces the pixel signals by extracting a predetermined area from an image pickup area of said image pickup circuit;
said second image pickup mode obtains the pixel signals from a larger area than said predetermined area by reducing the pixel signals in a different reducing method of said first mode, and said controlling unit changes the focal length of said lens to prevent a photo-taking angle from varying depending on a change from said first image pickup mode to said second image pickup mode.

2. An image pickup apparatus according to claim 1, wherein said setting unit further sets an image pickup mode for picking up a still image in which pixel signals are read out from whole area of said image pickup area.

3. An image pickup apparatus according to claim 1, wherein the image pickup mode is set according to an object an image of which is to be picked up.

4. An image pickup apparatus according to claim 1, wherein said setting controller sets the image pickup mode on the basis of evaluation values obtained from at least two distance measuring points.

5. An image processing system having a plurality of apparatuses communicatively interconnected, wherein at least one of said plurality of apparatuses has a function of an image pickup apparatus according to claim 1.

6. An image pickup method, comprising:
   a photoelectric conversion step of photoelectrically converting, by an image pickup circuit, into pixel signals, a light image formed through a lens;
   a setting step of setting at least a first image pickup mode and a second image pickup mode; and
   a controlling step of controlling to lengthen a focal length of said lens depending on a change from said first image pickup mode to said second image pickup mode,
   wherein, said first image pickup mode reduces the pixel signals by extracting a predetermined area from an image pickup area of said image pickup circuit;
   said second image pickup mode obtains the pixel signals from a larger area than said predetermined area by reducing the pixel signals in a different reducing method of said first mode, and
   said controlling step changes the focal length of said lens to prevent a photo-taking angle from varying depending on a change from said first image pickup mode to said second image pickup mode.

7. A storage medium which stores therein, in a computer-readable manner, a processing program for executing a function of an image pickup apparatus having a photoelectric conversion circuit which photoelectrically converts, by an image pickup circuit, into pixel signals, a light image formed through a lens,
   said processing program having:
   a setting code for setting at least a first image pickup mode and a second image pickup mode; and
   a controlling code for controlling to lengthen a focal length of said lens depending on a change from said first image pickup mode to said second image pickup mode,
   wherein, said first image pickup mode reduces the pixel signals by extracting a predetermined area from an image pickup area of said image pickup circuit;
   said second image pickup mode obtains the pixel signals from a larger area than said predetermined area by reducing the pixel signals in a different reducing method of said first mode, and
   said controlling code changes the focal length of said lens to prevent a photo-taking angle from varying depending on a change from said first image pickup mode to said second image pickup mode.

8. An image pickup apparatus, comprising:
   an image pickup circuit which photoelectrically converts, into pixel signals, a light image formed through a lens;
   a setting unit which sets at least a first image pickup mode and a second image pickup mode; and
   a controlling unit which controls to shorten a focal length of said lens depending on a change from said second image pickup mode to said first image pickup mode
   wherein, said first image pickup mode reduces the pixel signals by extracting a predetermined area from an image pickup area of said image pickup circuit;
   said second image pickup mode obtains the pixel signals from a larger area than said predetermined area by reducing the pixel signals in a different reducing method of said first mode, and
   said controlling unit changes the focal length of said lens to prevent a photo-taking angle from varying depending on a change from said second image pickup mode to said first image pickup mode.

* * * * *